US008508796B2

(12) United States Patent
Harada

(10) Patent No.: US 8,508,796 B2
(45) Date of Patent: Aug. 13, 2013

(54) IMAGE FORMING APPARATUS, METHOD AND PROGRAM FOR SELECTIVELY PRINTING WITH TRANSPARENT AND NON-TRANSPARENT PRINTING AGENTS

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/743,626

(22) PCT Filed: Apr. 13, 2010

(86) PCT No.: PCT/JP2010/056892
§ 371 (c)(1), (2), (4) Date: May 19, 2010

(87) PCT Pub. No.: WO2010/134410
PCT Pub. Date: Nov. 25, 2010

(65) Prior Publication Data

US 2011/0116111 A1 May 19, 2011

(30) Foreign Application Priority Data

May 21, 2009 (JP) ................................ 2009-123534

(51) Int. Cl.
*G06F 15/00* (2006.01)
*G06K 1/00* (2006.01)
*H04N 1/60* (2006.01)

(52) U.S. Cl.
USPC .......................................... 358/1.9; 358/1.12

(58) Field of Classification Search
None
See application file for complete search history.

(56) References Cited

U.S. PATENT DOCUMENTS 7,097,898 B2 * 8/2006 Fujisawa .................... 428/195.1
8,335,012 B2 * 12/2012 Iguchi ............................ 358/1.9
2009/0034998 A1 2/2009 Omata

FOREIGN PATENT DOCUMENTS

JP 2006-171306 A 6/2006
JP 2007-52175 A 3/2007
JP 2008-145784 A 6/2008
JP 2009-058941 A 3/2009

OTHER PUBLICATIONS

Notification of Transmittal of the International Search Report and the Written Opinion of the International Searching Authority, International Search Report, and Written Opinion of the International Searching Authority, mailed Jul. 13, 2010, in counterpart International Application No. PCT/JP2010/056892.
Notification of Reasons for Refusal dated Mar. 15, 2013, in Japanese Application No. 2009-123534.

* cited by examiner

*Primary Examiner* — Douglas Tran
(74) *Attorney, Agent, or Firm* — Fitzpatrick, Cella, Harper & Scinto

(57) ABSTRACT

Disclosed is an image forming apparatus and method of controlling same for forming an image on a print medium using a non-transparent recording agent and a transparent recording agent. If the gloss level of an image to be formed is designated, the image is formed upon deciding whether or not image formation using the transparent recording agent is to be carried out, this decision being made based upon the designated gloss level and stored type information of the print medium used in image formation.

7 Claims, 7 Drawing Sheets

| SHEET TYPE | GRAMMAGE ($g/m^2$) | SURFACE PROPERTY | COLOR | PROFILE | ... |
|---|---|---|---|---|---|
| PLAIN PAPER | 80 ~ 100 | 0 | WHITE | A | ... |
| THICK PAPER 1 | 100 ~ 120 | 0 | WHITE | A | ... |
| THICK PAPER 2 | 120 ~ 140 | 0 | WHITE | A | ... |
| COATED PAPER 1 | 80 ~ 100 | 2 | WHITE | B | ... |
| COATED PAPER 2 | 100 ~ 120 | 2 | WHITE | B | ... |
| ... | ... | ... | ... | ... | ... |

IMAGE FORMING APPARATUS, METHOD AND PROGRAM FOR SELECTIVELY PRINTING WITH TRANSPARENT AND NON-TRANSPARENT PRINTING AGENTS

TECHNICAL FIELD

The present invention relates to an image forming apparatus for forming an image on a print medium (sheet), and to a method and program for controlling this apparatus.

BACKGROUND ART

Technology for making uniform the gloss level of an image, which is formed on a print medium, by using a transparent recording agent such as transparent toner is known in the art (see Japanese Patent Laid-Open No. 2006-171306). Through use of such technology, the gloss level of plain paper can be increased by applying transparent toner to the plain paper, by way of example.

In cases where printing is performed using a transparent recording agent, however, there are occasions where the gloss level of the surface of the transparent recording agent after thermal fixation is made higher than the original gloss level of the print medium (sheet) and occasions where it falls below the original gloss level of the print medium, depending upon the type of print medium printed on. Accordingly, there are instances where even though an image is printed using the transparent recording agent, the gloss level is not always increased and a printout having the gloss level desired by the user is not output.

SUMMARY OF INVENTION

An aspect of the present invention is to eliminate the above-mentioned problems with the conventional technology.

The present invention provides an arrangement whereby an image that is based upon a gloss level desired by a user can be formed based upon characteristic information of a print medium.

According to an aspect of the present invention, there is provided an image forming apparatus comprising: image forming means for forming an image on a print medium using a non-transparent recording agent and a transparent recording agent; and designation means for designating gloss level of the image formed by the image forming means; control means for controlling image formation, which employs the transparent recording agent, by the image forming means based upon the gloss level designated by the designation means and the type information of the print medium used in image formation by the image forming means.

According to another aspect of the present invention, there is provided a method of controlling an image forming apparatus, comprising: an image forming step of forming an image on a print medium using a non-transparent recording agent and a transparent recording agent; and a designation step of designating gloss level of the image formed at the image forming step; a control step of controlling image formation, which employs the transparent recording agent, in the image forming step based upon the gloss level designated in the designation step and the type information of the print medium used in image formation in the image forming step.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
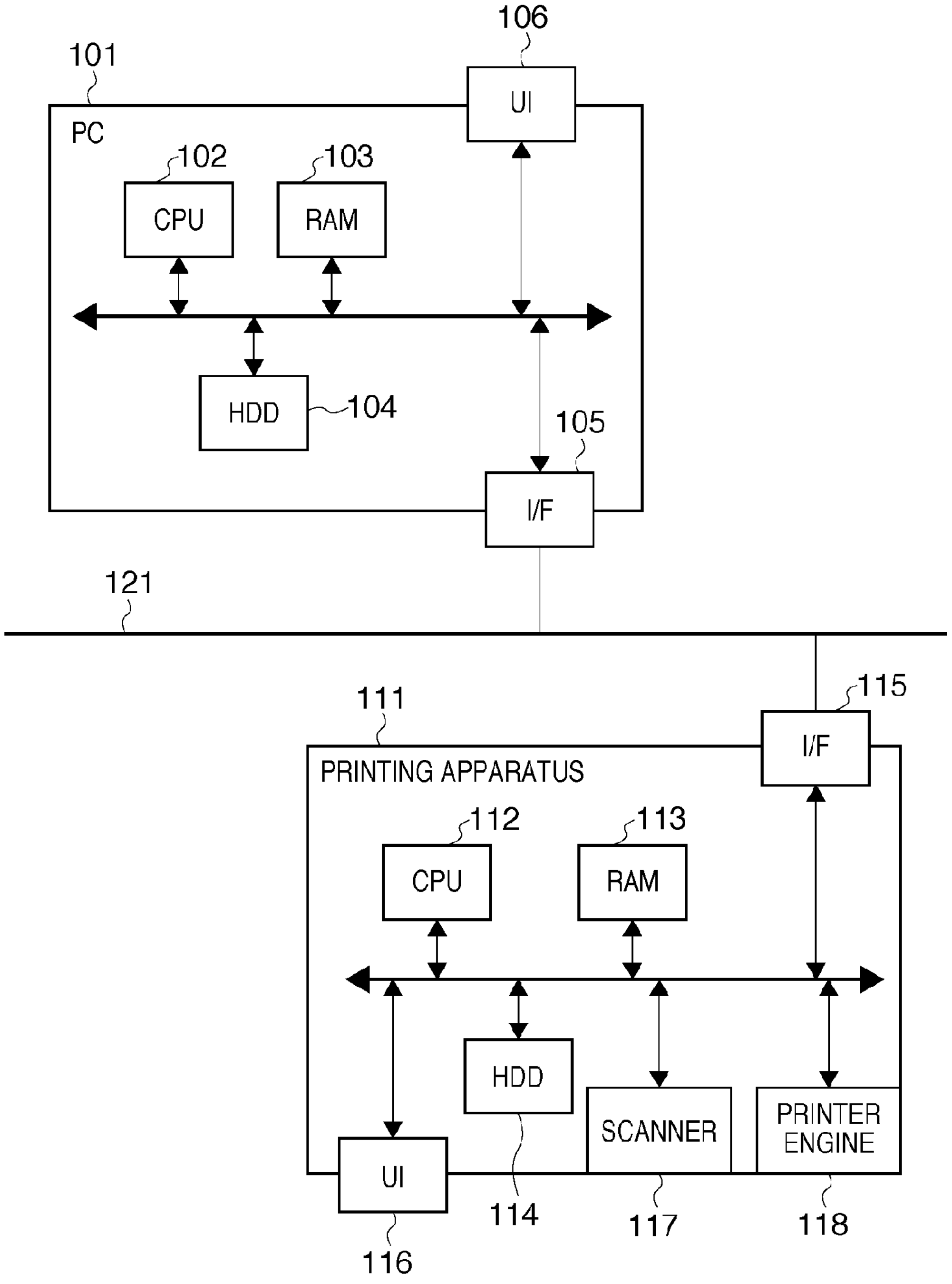
FIG. 1 is a diagram illustrating the configuration of a print system according to a first embodiment of the present invention.

FIG. 1 is a diagram illustrating the configuration of a print system according to a first embodiment of the present invention. This system includes a personal computer 101 and a printing apparatus (image forming apparatus) 111 connected via a network 121.

The configuration of the personal computer 101 will be described. A CPU 102 exercises overall control of the personal computer 101. A RAM 103 stores a program executed by the CPU 102 and is used as a work memory for storing various data when processing is executed by the CPU 102. An operating system and various applications and the like are installed on a hard-disk drive (HDD) 104. At the time of execution, these programs are loaded into the RAM 103 and executed by the CPU 102. A communication interface 105 communicates with various devices on the network 121 via the network 121. A user interface (UI) 106, which has a keyboard, display unit and pointing device and the like, is operated by the user and displays results of processing as well as messages and the like presented to the user.

The printing apparatus 111, which is an image forming apparatus, will be described next.

A CPU 112 operates in accordance with a program that has been loaded into a RAM 113 from a hard-disk drive (HDD) 114. The RAM 113 stores a program executed by the CPU 112 and is used as a work memory for storing various data when processing is executed by the CPU 112. An operating system and various applications are installed on the hard-disk drive 114. At the time of execution, these programs are loaded into the RAM 113 and executed by the CPU 112. The hard-disk drive 114 is also used to store print data received from the personal computer and image data that has been read by a scanner 117. A communication interface 115 communicates with various devices on the network 121 via the network 121. A user interface (UI) 116, which has a keyboard, display unit and pointing device and the like, is operated by the user and inputs content specified by the user. The scanner 117 reads an original and generates image data representing the image of the original. A printer engine 118 prints an image on a print medium (sheet) by an electrophotographic method. The user interface 116 of the printing apparatus 111 according to this embodiment preferably is implemented by a touch-sensitive panel obtained by integrating the display section and input section. The printing apparatus 111 can be an MFP (multi-function peripheral).

Figure 2:
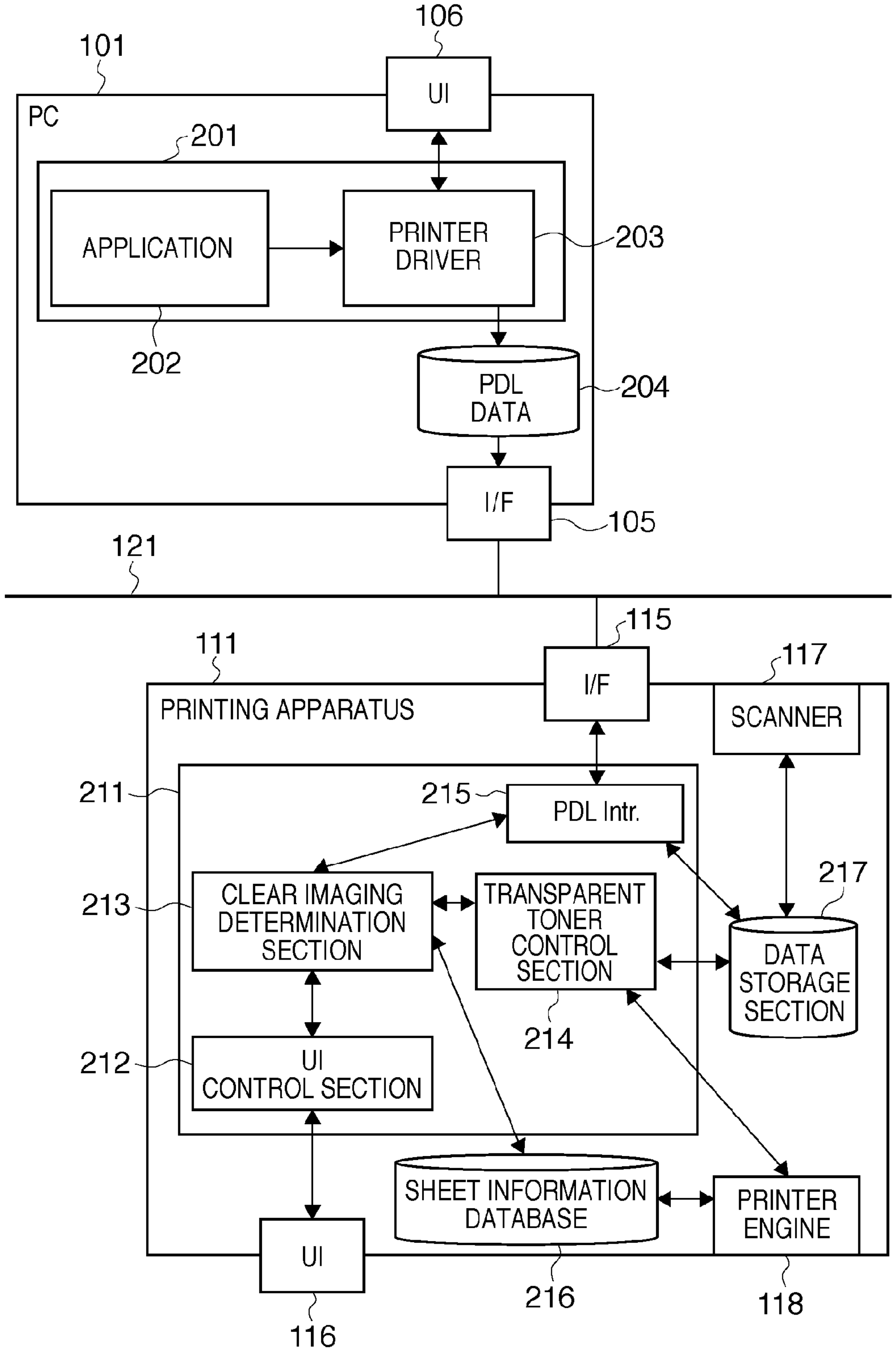
FIG. 2 is a block diagram illustrating the arrangement of software modules in the print system.

FIG. 2 is a block diagram illustrating the arrangement of software modules in the print system according to this embodiment. It should be noted that components in FIG. 2 similar to those shown in FIG. 1 are designated by like reference characters and need not be described again.

The software possessed by the personal computer 101 will be described first.

A software group 201 is executed by the CPU 102 of personal computer 101. An application 202 creates data and orders printing of this data. Upon receiving the order to print and the data from the application 202, a printer driver 203 creates PDL data 204 based thereon and sends this data to the printing apparatus 111 via the communication interface 105. The operating screen of the printer driver 203 is displayed by the user interface 106.

Next, the software possessed by the printing apparatus 111 will be described.

A control software group 211 controls the printing apparatus 111. A UI (user interface) control section 212 controls output of data to and input of data from the user interface 116. A clear imaging determination section 213 obtains information concerning the print medium (sheet) on which printing is performed from a sheet information database 216 and determines what should be done in order to increase or decrease the gloss level of the sheet by applying a transparent toner (transparent recording agent) to the sheet. A transparent toner control section 214 exercises control so as to cause the printer engine 118 to execute the optimum transparent toner print processing based upon the determination made by the clear imaging determination section 213. A PDL interpreter 215 analyzes the PDL data received from the personal computer 101. An image data storage section 217 stores image data that has been read by the scanner 117 or image data that has been rendered by the PDL interpreter 215. The image data storage section 217 is provided in the RAM 113 or hard-disk drive 114 shown in FIG. 1.

Figure 3:
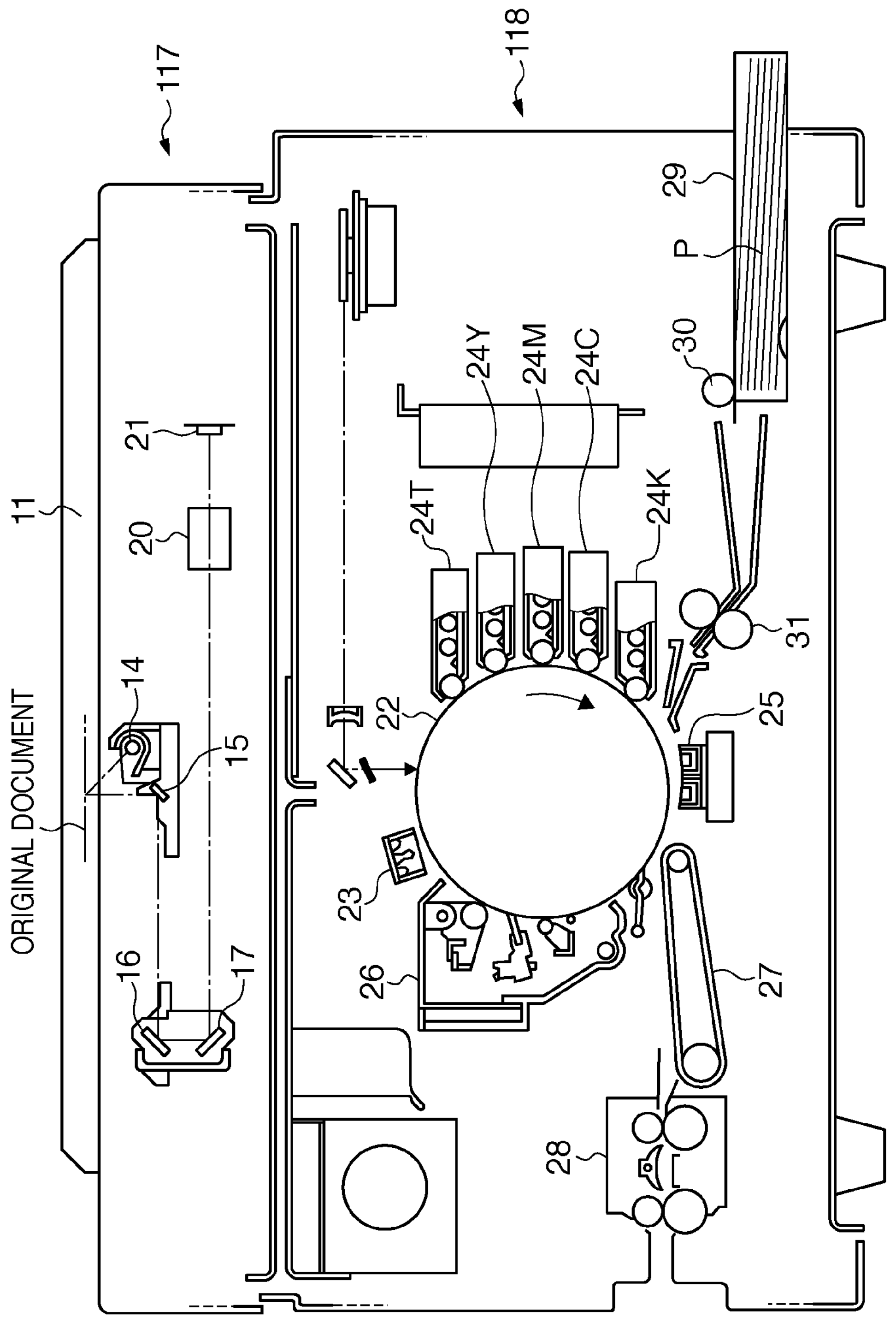
FIG. 3 depicts a sectional view for describing the structure of a printing apparatus according to the first embodiment.

FIG. 3 depicts a sectional view describing the structure of the printing apparatus 111 according to the first embodiment. In this embodiment, the printing apparatus 111 will be described taking as an example a multifunction peripheral that has a copy function.

The scanner 117 is furnished with an original placing unit 11 comprising a platen glass, which comprises a transparent glass plate or the like, and a cover for covering an original that has been placed on the platen glass. Light reflected from the original illuminated by an illuminating lamp 14 below the platen glass is reflected by mirrors 15, 16, 17 and forms an image on a CCD sensor 21 through a lens 20. Image data that has been read by the CCD sensor 21 is processed by a signal processing circuit (not shown) and the processed signal is output to the printer engine 118 as an image signal.

The printer engine (image forming unit (118) has a photosensitive drum 22 serving as an image forming body, as well as a charger 23 and exposure unit arranged on the circumference of the photosensitive drum 22. The printer engine 118 further includes developers 24T (transparent toner), 24Y (yellow toner), 24M (magenta toner), 24C (cyan toner) and 24K (black toner), a transfer unit 25, a cleaning unit 26, a conveyance belt 27 and a fixing unit 28.

Among the developers 24T, 24Y, 24M, 24C and 24K, the developer 24T containing transparent toner T is placed at the point farthest upstream along the circumference of the photosensitive drum 22, and the developer 24K containing black toner is placed at the point farthest downstream along the circumference of the photosensitive drum 22. The color toners (color recording agents, non-transparent toners, non-transparent agents) contained in the developers 24Y, 24M, 24C and 24K are of the well-known type and need not be described here. The transparent toner (transparent recording agent) contained in the developer 24T transmits almost all of the light of the visible wavelength region and therefore does not contribute to the image density of the color image obtained. This toner is the result of removing colorants and dyes from ordinary color toner.

A paper cassette 29 contains a plurality of sheets P. The topmost sheet contained in the paper cassette 29 is extracted and conveyed by rotation of a pick-up roller 30 and is fed to the transfer unit 25 by rotation of registration rollers 31. The toner image on the photosensitive drum 22 is transferred to the sheet at the transfer unit 25.

When image formation starts, first the photosensitive drum 22 is rotated in the direction of the arrow, an electrostatic latent image of the transparent toner image is formed on the photosensitive drum 22 by an image signal corresponding to the transparent toner (T), and the latent image is developed by the transparent toner to thereby obtain a transparent toner image. Next, charging by the charger 23 and formation of the electrostatic latent image of the yellow (Y) image corresponding to the yellow image signal are carried out so that this electrostatic latent image is developed by the Y toner from the developer 24Y. Next, the electrostatic latent image of the magenta (M) image is formed and the M-toner image is formed by the developer 24M in a similar manner. Thereafter, and in similar fashion, the C (cyan)-toner image and the black toner image are formed on the photosensitive drum 22. Thus, multiple color images to which the transparent toner has been added are formed on the photosensitive drum 22.

The color toner images thus formed on the photosensitive drum 22 are transferred by the transfer unit 25 to the sheet (transfer paper) supplied from the paper cassette 29. The transfer sheet to which the color toner images have been transferred (it being so arranged that the transparent toner image forms the topmost layer in the manner described) is sent to and fixed by the fixing unit 28, after which the sheet is discharged to the exterior of the apparatus by rotation of a discharge roller.

In the embodiment described above, it is described that the transparent toner image is formed on the color image on a sheet. However, it may be arranged so that the transparent toner image is formed as the lowermost layer of the color image on a sheet by forming the transparent toner image on the color image on the photosensitive drum 22.

Figure 4:
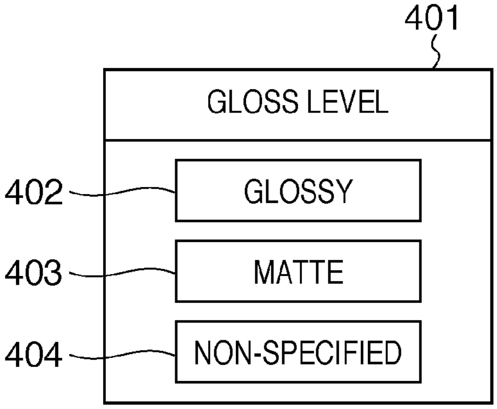
FIG. 4 is a diagram illustrating an example of a user interface for setting gloss level based upon a transparent toner in the printing apparatus.

FIG. 4 is a diagram illustrating an example of the user interface 116 that is capable of designating gloss level based upon transparent toner in the printing apparatus 111 according to the first embodiment.

Dialog 401 for setting gloss level is displayed by additionally providing the existing user interface with a button for designating the gloss level and having the user press this button. This button is added at a suitable location on the existing user interface. Since the position at which the setting is displayed depends upon the product and this position may be anywhere on the screen, a diagram is not shown. Specifically, the button is displayed by being added to a copy specifying screen on the console unit of the user interface 116. In this embodiment, the screen shown in FIG. 4 may be displayed on the user interface 106 of the personal computer 101 or on the user interface 116 of the printing apparatus 111.

In FIG. 4, "GLOSSY" 402 is a button for specifying an increase in gloss level, "MATTE" 403 is a button for specifying a decrease in gloss level, and "NON-SPECIFIED" 404 is a button for specifying that no gloss level is designated (namely for merely applying transparent toner). In other words, "GLOSSY" 402 is a button for setting the gloss level to a first gloss level, which is a gloss level higher than that when "MATTE" 403 is designated. By pressing the button 402, the user can make a designation that will make a sheet a glossy sheet. On the other hand, "MATTE" 403 is a button for setting the gloss level to a second gloss level, which is a gloss level lower than the first gloss level of "GLOSSY" 402. By pressing the button 403, the user can make a designation that will reduce sheet gloss.

Figure 5:
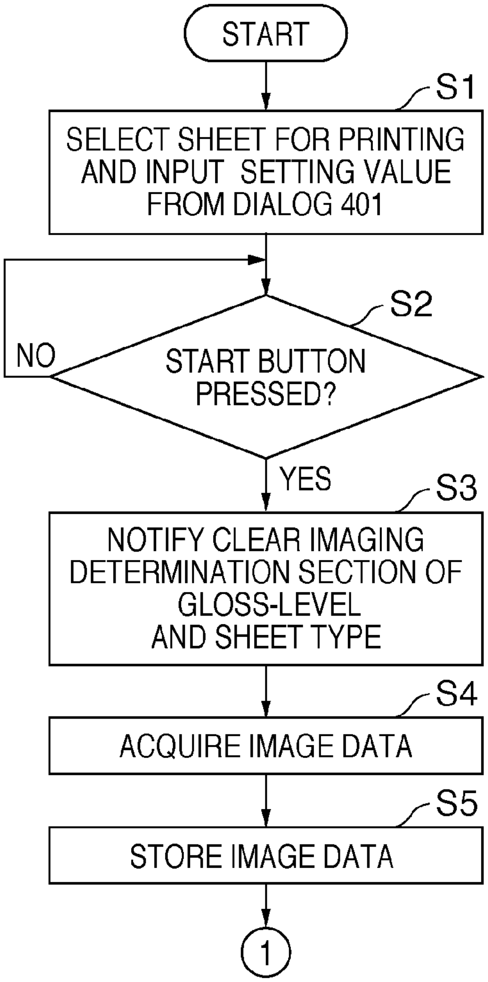
FIG. 5 is a flowchart describing processing from acceptance of image data to start of printing in the printing apparatus.

FIG. 5 is a flowchart describing processing of the printing apparatus 111, and the processing corresponds from acceptance of image data to start of printing in the printing apparatus 111 according to the first embodiment.

First, in step S1, the sheet type (size and type) is designated and input by the user at the user interface 11. Further, using the dialog 401 (FIG. 4) displayed on the user interface 116, the user inputs setting information relating to the gloss level set by the user. Next, control proceeds to step S2, where the system waits for the start button on the user interface 116 to be pressed. If the start button is pressed, control proceeds to step S3. Here the UI control section 212 notifies the clear imaging determination section 213 of the gloss-level setting information and sheet type acquired in step S1. Image data for printing is acquired in step S4. If copying has been specified, the image data that has been read by the scanner 117 is acquired. Further, in case of box printing, image data that has been stored on the hard-disk drive 114 is read out. Control then proceeds to step S5, in which the image data acquired in step S4 is stored in the image data storage section 217. Control proceeds to step S31 in FIG. 8.

Figure 6:
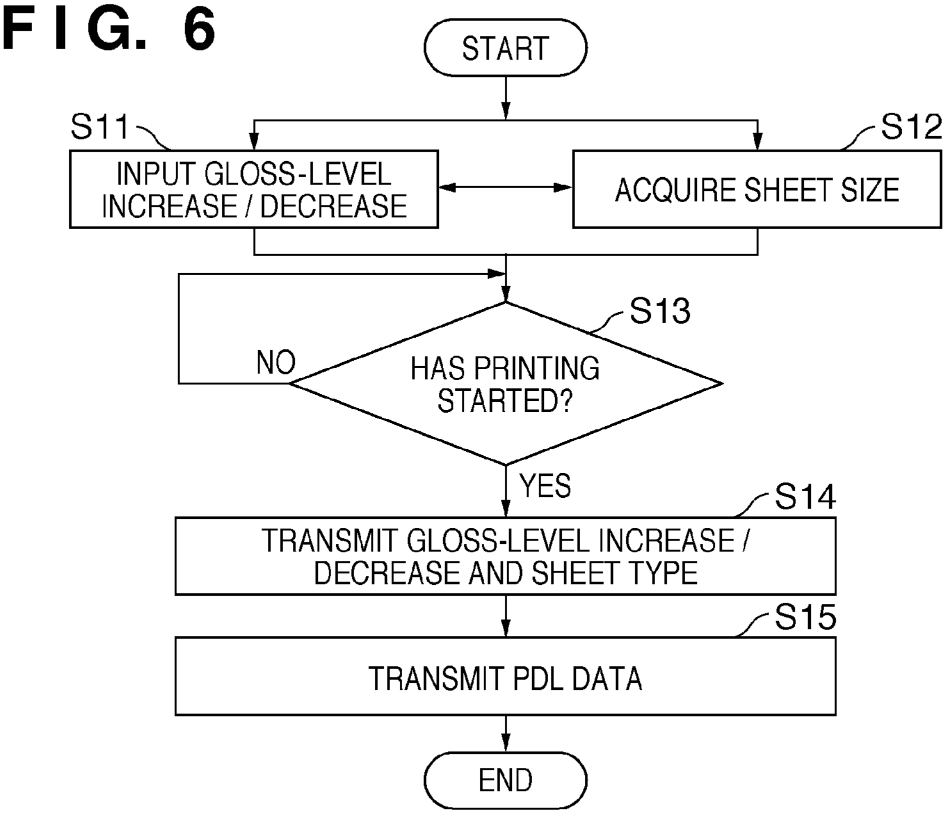
FIG. 6 is a flowchart describing processing for transmitting print data from a personal computer to the printing apparatus.

FIG. 6 is a flowchart describing processing of the personal computer 101 which transmits print data to the printing apparatus 111. The program for executing this processing is loaded into the RAM 103 from the hard-disk drive 104 at the time of execution and is executed under the control of the CPU 102.

First, information relating to the gloss level designated by the user using the user interface screen of FIG. 4 is acquired in step S11. The sheet size designated by the user is acquired in step S12. It does not matter which of steps S11 and S12 is executed first. Step S11 can be omitted in a case where clear printing using transparent toner is not executed, or in a case where the clear-printing setting is made at the printing apparatus 111 and not at the personal computer 101, or in a case where clear printing is performed but the gloss level is not designated.

Next, in step S13, the system waits for a print instruction to be issued. In step S14, the printer driver 203 notifies the printing apparatus 111 of the gloss-level information and sheet size. Control then proceeds to step S15. Here the printer driver 203 converts the image created by the application 202 to PDL data and transmits the PDL data to the printing apparatus 111.

Figure 7:
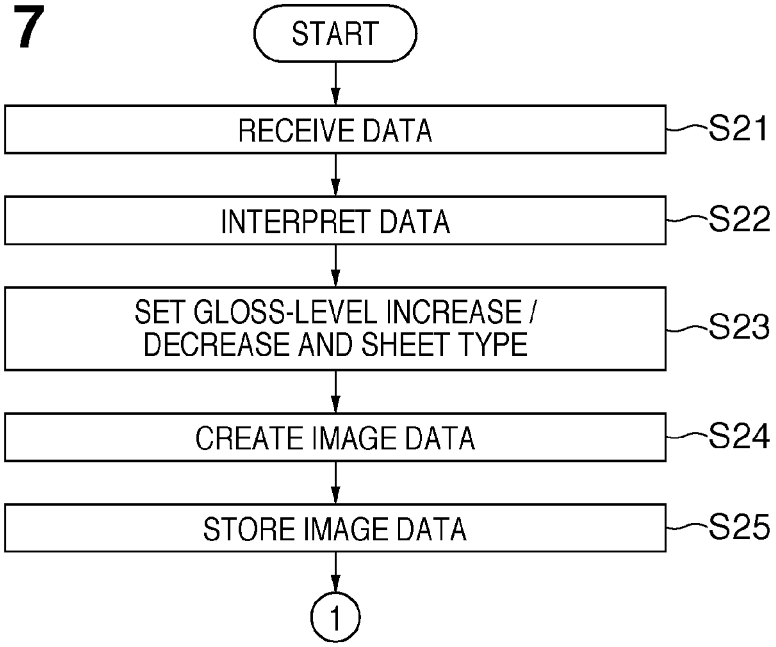
FIG. 7 is a flowchart describing processing from acceptance of data by the printing apparatus from a personal computer to a point immediately before execution of a printing operation.

FIG. 7 is a flowchart describing image-formation control processing of the printing apparatus 111, and the control processing corresponds from acceptance of data from the personal computer 101 to a point immediately before execution of a printing operation by the printing apparatus 111 according to the first embodiment. The program for executing this processing is stored in the RAM 113 at the start of execution and is executed under the control of the CPU 112.

PDL data is received from the personal computer 101 in step S21. Next, the PDL data is analyzed by the PDL interpreter 215. If the received data contains selection information relating to specification of an increase or decrease in gloss level and sheet type, then this information is set in the clear imaging determination section 213 in step S23. When such information has not been set, ordinary PDL print processing is executed in accordance with the default specifications of the printing apparatus 111. Next, in step S24, image data is created (rendered) from the PDL data and the image data is stored in the image data storage section 217 in step S25.

Figure 8:
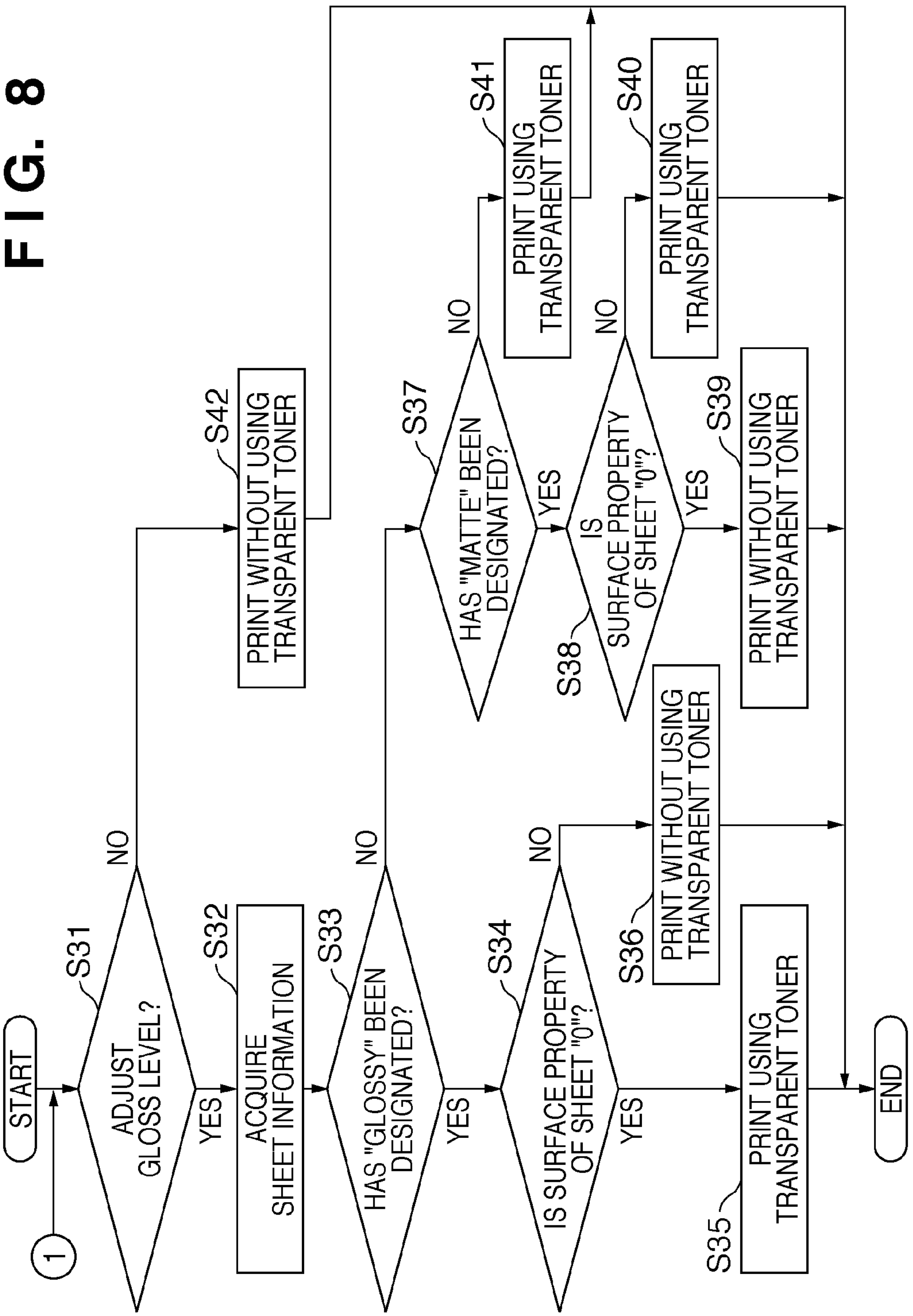
FIG. 8 is a flowchart describing print processing in the printing apparatus.

FIG. 8 is a flowchart describing print processing in the printing apparatus 111 according to the first embodiment. The program for executing this processing is stored in the RAM 113 at the start of execution and is executed under the control of the CPU 112.

First, in step S31, the CPU 112 determines whether adjustment of the gloss level has been designated by the screen shown in FIG. 4. If designation of gloss-level adjustment has been determined in step S31, control proceeds to step S32. On the other hand, if designation of gloss-level adjustment has not been determined in step S31, control proceeds to step S42. In step S42, the CPU 112 causes printing to be performed using color toners such as CMYK without use of transparent toner. If designation of gloss-level adjustment has been determined in step S31, on the other hand, then control proceeds to step S32 and the CPU 112 acquires sheet information (sheet characteristic information) shown in FIG. 9 from the hard-disk drive 114.

Figures 9, 10:
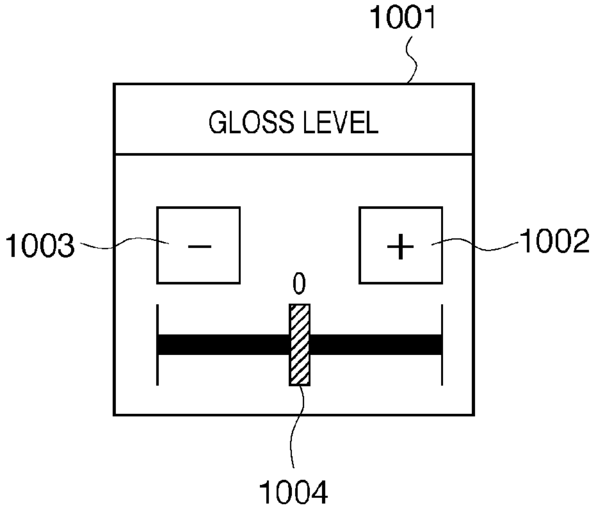
FIG. 9 is a diagram illustrating an example of sheet information according to the first embodiment.
FIG. 10 depicts a view illustrating an example of a user interface screen according to a second embodiment of the present invention.

FIG. 9 is a diagram illustrating an example of sheet information (sheet characteristic information) according to the first embodiment.

A characteristic storage section storing the sheet characteristic information of this print medium (sheet) is provided in the hard-disk drive 114 according to this embodiment. The sheet information includes sheet type (paper name), grammage, surface property, color and profile.

Based upon the sheet characteristic information acquired in step S32, the CPU 112 determines whether or not the transparent toner is to be applied at the time of printing of the image.

Specifically, in a case where the set sheet has a surface property the value of which is smaller than "1", the gloss level is increased by applying the transparent toner. On the other hand, the gloss level is reduced if the transparent toner is applied to sheet whose surface property has a value smaller than "2". Accordingly, if "GLOSSY" has been selected using the screen shown in FIG. 4, then, in a case where the sheet type used is "PLAIN PAPER", "THICK PAPER 1" or "THICK PAPER 2", the clear imaging determination section 213 determines that the user request will be satisfied by applying the transparent toner. On the other hand, in a case where the sheet type used is "COATED PAPER 1" or "COATED PAPER 2", the clear imaging determination section 213 determines that the user request will be satisfied by not applying the transparent toner. Further, if "MATTE" has been set using the screen shown in FIG. 4, then, in a case where the sheet type used is "PLAIN PAPER", "THICK PAPER 1" or "THICK PAPER 2", the clear imaging determination section 213 determines that the user request will be satisfied by not applying the transparent toner. On the other hand, in a case where the sheet type used is "COATED PAPER 1" or "COATED PAPER 2", the clear imaging determination section 213 determines that the user request will be satisfied by not applying the transparent toner. Control whereby the CPU 112 decides whether printing is to be performed using or not using the transparent toner based upon the sheet information will be described below taking the foregoing into consideration.

It step S33, the CPU 112 determines whether or not "GLOSSY" has been designated by the user. If "GLOSSY" has been designated, control proceeds to step S34. Here the CPU 112 determines whether or not the surface property of the sheet information (sheet characteristic information) is "0". If the surface property of the sheet information is "0", then the gloss level is increased by applying the transparent toner. Accordingly, if the CPU 112 has determined that the surface property of the sheet information is "0" in step S34, control proceeds to step S35 and the CPU 112 exercises control so as to print using the transparent toner. On the other hand, if the CPU 112 has determined that the surface property of the sheet information is not "0" at step S34, then control proceeds to step S36 and the CPU 112 exercises control so as to print using the necessary toner from among the CMYK toners without using the transparent toner.

Further, if the CPU 112 determines in step S33 that "GLOSSY" has not been designated by the user, then control proceeds to step S37. In step S37, the CPU 112 determines whether or not "MATTE" has been designated. If it is determined in step S37 that "MATTE" has been designated, control proceeds to step S38. In step S38, the CPU 112 determines whether or not the surface property of the sheet information (sheet characteristic information) is "0". If the surface property of the sheet information is "0", control proceeds to step S39 and the CPU 112 exercises control so as to print using the necessary toner from among the CMYK toners without using the transparent toner. On the other hand, if the CPU 112 has determined that the surface property of the sheet information is not "0" in step S38, then control proceeds to step S40 and the CPU 112 exercises control so as to print using the transparent toner. In this case, the transparent toner is applied to a sheet having a strong surface property (a high gloss level), and there the glossiness of the sheet is reduced. Further, if it is determined in step S37 that "MATTE" has not been designated, control proceeds to step S41. This is a case where "NON-SPECIFIED" shown in FIG. 4 has been designated. In step S41, the CPU 112 exercises control so as to print using the transparent toner.

By exercising the control described above, a printout conforming to a gloss level designated by the user is output in accordance with the type of a sheet used in image formation. As a result, on the basis of sheet characteristic information, the user is capable of acquiring a printout that has undergone image formation based upon the desired gloss level.

In the first embodiment described above, the gloss level is designated by using the user interface shown in FIG. 4.

FIG. 10 is a diagram illustrating an example of a user interface screen 1001 according to a second embodiment of the present invention. It should be noted that the configuration and operation of the printing apparatus 111 and personal computer 101 according to the second embodiment are basically the same as in the first embodiment and need not be described again.

Gloss level can be set to a plurality of levels using the user interface screen 1001 of FIG. 10.

The user interface screen 1001 of FIG. 10 has a button (+) 1002 for specifying an increase in gloss level, and a button (−) 1003 for specifying a decrease in gloss level. By using these buttons, the user can move a slide bar 1004 and thus ascertain the extent of the gloss level. Alternatively, by using a pointing device, the user can slide the bar 1004 directly to designate the gloss level.

In another variant, if the gloss level can be set to a number of levels, it may be arranged so that a numerical value is input directly. [For example, the gloss level may be set to a range of "−X" to "+X" (where X is a natural number).] Here "−X" is a designation in which the larger the value of X, the more the gloss level is reduced, and "+X" is a designation in which the larger the value of X, the more the gloss level is increased.

Thus, in a case where gloss level is set to a plurality of levels, the surface property information may be set to multiple levels such as "0" to "10" rather than to "0" to "2", and the amount of transparent toner applied may be adjusted based upon the surface property information of each sheet.

In this case, the CPU 112 exercises control as set forth below by way of example. It the examples described, it will be assumed that "−10" to "+10" can be designated as the gloss level and that the amount of transparent toner that can be applied to a sheet is "0 to 100".

(1) Case 1 where it is desired to output a printed sheet having gloss gloss level designated by user: "+10"

surface property of sheet used in image formation: "0"

amount of transparent toner applied to sheet: 100

(2) Case 2 where it is desired to output a printed sheet having gloss gloss level designated by user: "+2"

surface property of sheet used in image formation: "0"

amount of transparent toner applied to sheet: 20

(3) Case 3 where it is desired to output a printed sheet having gloss gloss level designated by user: "−10"

surface property of sheet used in image formation: "0"

amount of transparent toner applied to sheet: 0

(4) Case 1 where it is desired to output a printed sheet having reduced gloss gloss level designated by user: "−5"

surface property of sheet used in image formation: "10"

amount of transparent toner applied to sheet: 50

(5) Case 2 where it is desired to output a printed sheet having reduced gloss gloss level designated by user: "−10"

surface property of sheet used in image formation: "10"

amount of transparent toner applied to sheet: 100

(6) Case 3 where it is desired to output a printed sheet having reduced gloss gloss level designated by user: "−10"

surface property of sheet used in image formation: "0"

amount of transparent toner applied to sheet: 0

Items (1) and (2) above are examples of cases where a printed sheet having gloss is output by performing printing using transparent toner on a sheet having a low gloss level. Item (3) is an example of a case where, when image formation processing is executed using a sheet that originally has a low gloss level, the user makes a designation such that printing of reduced gloss level is carried out. In this case, the CPU 112 exercises control in such a manner that the transparent toner is not applied to the sheet. Items (4) and (5) above are examples of cases where a printed sheet having reduced gloss is output by performing printing using transparent toner on a sheet having a high gloss level. Item (6) is an example of a case where, when image formation processing is executed using a sheet that originally has a low gloss level, the user makes a designation such that printing with a reduced gloss is carried out.

Thus, sheet surface property and amount of toner applied to the sheet are controlled so as to output a printed sheet conforming to a user-designated gloss level. As a result, the user is capable of setting a plurality of levels and can adjust gloss level more finely.

In accordance with the second embodiment, as described above, gloss level can be designated more simply and easily.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123534, filed May 21, 2009, which is hereby incorporated by reference herein in its entirety.

The invention claimed is:

1. A printing apparatus comprising:

a printing unit configured to perform printing on a sheet using a non-transparent recording agent and a transparent recording agent to generate a print product; and a control unit configured to control the printing unit to perform printing without using the transparent recording agent in a case where it is designated to gloss the print product and a type of the sheet is a coated sheet.

2. The apparatus according to claim 1, wherein the control unit controls the printing unit to perform printing using the transparent recording agent in a case where it is designated to gloss the print product and the type of sheet is not the coated sheet.

3. The apparatus according to claim 1, wherein the control unit controls the printing unit to perform printing using the transparent recording agent in a case where it is designated to decrease gloss of the print product and the type of sheet is the coated sheet.

4. The apparatus according to claim 1, wherein the control unit controls the printing unit to perform printing without using the transparent recording agent in a case where it is designated to decrease gloss of the print product and the type of sheet is not the coated sheet.

5. A printing apparatus comprising:

a printing unit configured to perform printing on a sheet using a non-transparent recording agent and a transparent recording agent to generate a print product; and a control unit configured to control the printing unit to perform printing without using the transparent recording agent in a case where it is designated to gloss the print product and the type of sheet is a predetermined type of sheet, and to control the printing unit to perform printing using the transparent recording agent in a case where it is designated to gloss the print product and the type of sheet is not the predetermined type of sheet.

6. A method of controlling a printing apparatus comprising:

performing printing on a sheet using a non-transparent recording agent and a transparent recording agent to generate a print product; and controlling the printing apparatus to perform printing without using the transparent recording agent in a case where it is designated to gloss the print product and a type of the sheet is a coated sheet.

7. A non-transitory, computer-readable storage medium storing a computer-executable program for controlling a printing apparatus, the computer-executable program comprising:

code to perform printing on a sheet using a non-transparent recording agent and a transparent recording agent to generate a print product; and code to control the printing apparatus to perform printing without using the transparent recording agent in a case where it is designated to gloss the print product and a type of the sheet is a coated sheet.

* * * * *